Patented May 18, 1954

2,678,953

UNITED STATES PATENT OFFICE 2,678,953

METHOD OF MAKING FLUORINATED ORGANIC BROMIDES AND RESULTING NEW CHEMICAL COMPOUNDS

James C. Conly, Santa Monica, Calif., assignor to Douglas Aircraft Company, Inc., Santa Monica, Calif.

No Drawing. Application October 14, 1950, Serial No. 190,251

10 Claims. (Cl. 260—653)

This invention relates to a method of making the bromide of fluorinated hydrocarbons and derivatives thereof and relates to the resulting new chemical compounds, that is, the resulting fluorinated organic bromides.

In accordance with my invention the discovery has been made that the bromide of fluorinated hydrocarbons or derivatives can be made by reacting a metal salt of the acid, as represented by the formula RCOOM in which R is the fluorinated hydrocarbon or derivative and M the metal, with bromine to obtain the corresponding bromide, as represented by the formula RBr.

In accordance with the method of my invention, I start with a carboxylic acid, the carboxyl group of which is bonded to the fluorinated hydrocarbon or derivative, the bromide of which is to be made. This acid is reacted with the oxide or the carbonate of the metal to produce the corresponding metal carboxylate. The salt is dried, and, preferably in the dry state, is reacted with bromine to make the desired bromide of the fluorinated hydrocarbon or derivative.

My invention will be illustrated by the following example:

The silver salt or heptafluorobutyric acid was made by allowing an ether solution of the acid to react with an excess of powdered silver carbonate. When $CO_2$ evolution ceased, the ether was decanted and the solution evaporated leaving the solid silver salt which needed only to be dried overnight in vacuo to be suitable for the next step. The yield was almost quantitative. The dried silver salt (42.5 grams, 0.113 mole) was placed in a flask fitted with a stirring apparatus, a dropping funnel and an efficient water-cooled reflux condenser which was in turn connected to a Dry Ice trap. Bromine was added rapidly from the dropping funnel to the silver salt and stirring commenced. A fairly vigorous reaction ensued and hepta fluoropropyl bromide and $CO_2$ were evolved and carried over to the Dry-Ice trap where the bromide condensed and was collected in very good yield. On redistillation the product boiled at 12–13° C.

This process may be used with the metal salts of a wide number of fluorinated organic carboxylic acids, either simple acids or those containing a number of other functional groups. By proper manipulation it may be used to make liquid, even high-boiling, and solid bromide as well as the volatile bromides as in the example above. That is, a liquid bromide may be distilled off, or a solid bromide may be separated out by crystallization.

Although the silver salts are preferred, the reaction may be carried out with other metal salts including metals of group I, group II and group III of the periodic table particularly including potassium, sodium, mercury, thallium, copper and cadmium. Moreover, although it is preferred to carry out the reaction with the salt in the dry state, as in the example above, the reaction may be carried out in an inert vehicle, for example, carbon tetrachloride or carbon disulphide provided the temperature is maintained low, for example, below about 10° C. With carbon tetrachloride as a vehicle, the reaction was found to proceed satisfactorily with a temperature within the range of 0–10° C. When the reaction is carried out without a liquid vehicle raising the temperature as by heating was found to increase the rate of the reaction. Also, an increase in the rate of reaction was observed upon illumination whether or not the liquid vehicle was used. For example, an increased rate was found with illumination in the visible region.

The compounds that may be treated by the process of this invention to make the bromide as described above particularly include (1) fluorinated carboxylic acids represented by the formula RCOOH, where R is represented by the formula $C_nF_{2n+1-m}H_m$—, with $n$ from 1 to 20 and $m$ less than $2n+1$, (2) a derivative of said fluorinated carboxylic acids having substituents which may be keto (—$COR_1$), carboxylate ester (—$COOR_1$), hydroxy, amino, ether (—$OR_1$), aldehydo (—CHO), nitro, halogen and cyano groups, where $R_1$ is a hydrocarbon radical, (3) a fluorinated aromatic carboxylic acid having from 6 to 20 carbon atoms, (4) a derivative of said fluorinated aromatic carboxylic acid having a substituent which may be keto, nitro, and halogen and (5) a fluorinated dicarboxylic acid represented by the formula $HOOCR_2COOH$ where $R_2$ is a fluorinated divalent hydrocarbon radical represented by the formula —$C_nF_{2n-m}H_m$— with $n$ from 1 to 8 and $m$ less than $2n$.

The following illustrate the carboxylic acids and the resulting bromide products made therefrom in accordance with my invention:

| Carboxylic Acid | Bromide Product |
|---|---|
| Group (1): | |
| $CF_3COOH$ | $CF_3Br$. |
| $CF_3CF_2COOH$ | $CF_3CF_2Br$. |
| $CF_3(CF_2)_2COOH$ | $CF_3(CF_2)_2Br$. |
| $CF_3(CF_2)_3COOH$ | $CF_3(CF_2)_3Br$. |
| $CF_3(CF_2)_4COOH$ | $CF_3(CF_2)_4Br$. |
| $CF_3(CF_2)_5COOH$ | $CF_3(CF_2)_5Br$. |
| $CF_3(CF_2)_6COOH$ | $CF_3(CF_2)_6Br$. |
| $CF_3(CF_2)_7COOH$ | $CF_3(CF_2)_7Br$. |
| $CF_3(CF_2)_8COOH$ | $CF_3(CF_2)_8Br$. |
| $CF_3(CF_2)_9COOH$ | $CF_3(CF_2)_9Br$. |
| $CH_2FCOOH$ | $CH_2FBr$. |
| $CHF_2COOH$ | $CHF_2Br$. |
| $CF_3CH_2COOH$ | $CF_3CH_2Br$. |
| $CH_3CF_2COOH$ | $CH_3CF_2Br$. |
| Group (2): | |
| (keto substituent)— | |
| $CH_3COCF_2COOH$ | $CH_3COCF_2Br$. |
| $CF_3COCH_2COOH$ | $CF_3COCH_2Br$. |
| (carboxylate ester substituent)— | |
| $CH_3OOCCF_2CF_2COOH$ | $CH_3OOCCF_2CF_2Br$. |
| $(C_2H_5OOC(CF_2)_4COOH$ | $C_2H_5OOC(CF_2)_4Br$. |
| (hydroxy substituent)$CH_2OHCF_2COOH$ | $CH_2OHCF_2Br$. |
| (amino substituent)$CH_2NH_2CF_2COOH$ | $CH_2NH_2CF_2Br$. |
| (ether substituent)$CH_3OCH_2CF_2COOH$ | $CH_3OCH_2CF_2Br$. |
| (aldehydo substituent)$CHOCF_2COOH$ | $CHOCF_2Br$. |
| (nitro substituent)$CH_2NO_2CF_2COOH$ | $CH_2NO_2CF_2Br$. |
| (halogen substituent)— | |
| $CF_2ClCOOH$ | $CF_2ClBr$. |
| $CF_2BrCOOH$ | $CF_2Br_2$. |
| $CFBr_2COOH$ | $CFBr_3$. |
| (cyano substituent)$CNCF_2CF_2COOH$ | $CNCF_2CF_2Br$. |
| Group (3): | |
| o-fluorobenzoic acid | o-fluoropheny bromide. |
| m-fluorobenzoic acid | m-fluoropheny bromide. |
| p-fluorobenzoic acid | p-fluorophenyl bromide. |
| o-trifluoromethyl benzoic acid | o-trifluoromethyl phenyl bromide. |
| m-trifluoromethyl benzoic acid | m-trifluoromethyl phenyl bromide. |
| p-trifluoromethyl benzoic acid | p-trifluoromethyl phenyl bromide. |
| Group (4): | |
| (keto substituent) 2-acetyl-3-trifluoro-methylbenzoic acid. | 2-acetyl-3-trifluoromethyl-phenyl bromide. |
| (nitro substituent) | |
| 2-nitro-4-trifluoro-methyl benzoic acid | 2-nitro-4-trifluoromethyl-phenyl bromide. |
| 2-trifluoromethyl-4-nitrobenzoic acid | 2-trifluoromethyl-4-nitrophenyl bromide. |
| (halogen substituent) 2-trifluoromethyl-6-chloro benzoic acid. | 2-trifluoromethyl-6-chlorophenyl bromide. |
| Group (5): | |
| $HOOCCF_2CF_2COOH$ | $BrCF_2Br$. |
| $HOOC(CF_2)_4COOH$ | $Br(CF_2)_4Br$. |
| $HOOC(CF_2)_3COOH$ | $Br(CF_2)_3Br$. |

Accordingly, my invention particularly includes the method of making such organic bromides and resulting new chemical compounds by reacting the metal salts of an organic acid, as described above, where the reaction may be represented by $$2RCOOM + Br_2 \rightarrow 2RBr +$$

in which M is the metal and in which R may be (1) a fluorinated hydrocarbon radical represented by the formula $C_nF_{2n+1-m}H_m$— with $n$ from 1 to 20 and $m$ less than $2n+1$, (2) a derivative of said fluorinated hydrocarbon radical having a substituent which may be keto, carboxylate ester, hydroxy, amino, ether, aldehydo, nitro, halogen or cyano, (3) a fluorinated aromatic hydrocarbon radical having from 6 to 20 carbon atoms, (4) a derivative of said fluorinated aromatic hydrocarbon radical having a substituent which may be keto, nitro or halogen, and (5) a divalent fluorinated hydrocarbon radical represented by the formula —$C_nF_{2n-m}H_m$— with $n$ from 1 to 8 and $m$ less than $2n$.

The products of this invention are useful as chain initiating and terminating agents in the manufacture of fluorinated polymers, for example, poly tetrafluorethylene and poly trifluorochloroethylene. For example, $CF_3Br$ may be used to form $CF_3(CF_2CF_2)_nCF_3$ from tetrafluorethylene or $CF_3(CF_2CFCl)_nCF_3$ from trifluorochloro-ethylene. Also the products of this invention are useful as solvents for fluorinated organic compounds, and fire-resistant materials. Some of the products which are normally liquid such as 1,8, dibromoperfluoro-octane is useful as a fire resistant hydraulic fluid.

The foregoing describes my invention in its preferred aspects, and illustrates my invention by way of specific examples, but alterations and modifications may be made thereof without departing from the invention herein disclosed.

Having described my invention I claim:

1. The method of making a fluorinated organic bromide which comprises reacting a metal salt of a fluorinated carboxylic acid with bromine and replacing the group of said salt represented by the formula —COOM, where M is the metal, with a bromide radical.

2. The method of making a fluorinated organic bromide represented by the formula $$C_nF_{2n+1-m}H_mBr$$

with $n$ from 1 to 20 and $m$ less than $2n+1$, which comprises reacting a metal salt of a carboxylic acid represented by the formula $$C_nF_{2n+1-m}H_mCOOM$$

where M is the metal, with bromine and replacing a group of the salt represented by the formula —COOM with a bromide radical.

3. The method of making a fluorinated organic bromide represented by the formula $$C_nF_{2n+1}Br$$

which comprises reacting a metal salt of a carboxylic acid represented by the formula $$C_nF_{2n+1}COOM$$

where M is the metal, with bromine, and replacing a group of the salt represented by the formula —COOM with a bromide radical.

4. The method of making heptafluoropropyl bromide which comprises reacting the silver salt of heptafluorobutyric acid with bromine and thereby replacing the radical represented by the formula —COOAg with a bromide radical.

5. The method of making trifluoromethyl bromide which comprises reacting the silver salt of trifluoroacetic acid with bromine and thereby replacing the radical represented by the formula —COOAg with a bromide radical.

6. The method of making pentafluoroethyl bromide which comprises reacting the silver salt of pentafluoropropionic acid with bromine and thereby replacing the radical represented by the formula —COOAg with a bromide radical.

7. The method of making nonafluorobutyl bromide which comprises reacting the silver salt of nonafluorovaleric acid with bromine and thereby replacing the radical represented by the formula —COOAg with a bromide radical.

8. The method of making undecylfluoropentyl bromide which comprises reacting the silver salt of caproic acid with bromine and thereby replacing the radical represented by the formula —COOAg with a bromide radical.

9. The method as defined in claim 3 in which the metal is a member of the group selected from groups I, II and III.

10. The method as defined in claim 3 in which the metal is silver.

References Cited in the file of this patent

UNITED STATES PATENTS

| Number | Name | Date |
| --- | --- | --- |
| 643,144 | Lederer | Feb. 13, 1900 |
| 2,176,181 | Hunsdiecker et al. | Oct. 17, 1939 |
| 2,192,143 | Midgley et al. | Feb. 27, 1940 |
| 2,365,516 | Benning et al | Dec. 19, 1944 |
| 2,377,297 | Lamb et al. | May 29, 1945 |
| 2,387,247 | Downing et al. | Oct. 23, 1945 |
| 2,500,218 | Towne et al. | Mar. 14, 1950 |
| 2,506,652 | Simons et al. | May 9, 1950 |
| 2,531,372 | Waterman et al. | Nov. 21, 1950 |
| 2,551,573 | Downing et al. | May 8, 1951 |
| 2,554,219 | Simons et al. | May 22, 1951 |

FOREIGN PATENTS

| Number | Country | Date |
| --- | --- | --- |
| 730,370 | France | May 10, 1932 |
| 581,405 | Great Britain | May 24, 1943 |

OTHER REFERENCES

Henne et al.: J. A. C. S 59, 2434–2436.
Henne et al.: J. A. C. S. 61, 2489–2491.
Henne et al.: J. A. C. S 63, 3476–3478.
Henne et al.: J. A. C. S. 58, 882–884.
McBee et al.: Inc. & Eng. Chem., 39, 420–421